United States Patent [19]
Hamaker

[11] 4,344,693
[45] Aug. 17, 1982

[54] BELT TRACKING SYSTEM

[75] Inventor: Ralph A. Hamaker, Penfield, N.Y.

[73] Assignee: Xerox Corporation, Stamford, Conn.

[21] Appl. No.: 140,342

[22] Filed: Apr. 14, 1980

[51] Int. Cl.³ .................. G03G 15/04; B65H 25/26
[52] U.S. Cl. ............................. 355/3 BE; 226/15; 226/21; 474/123
[58] Field of Search .................. 474/123; 226/21, 18, 226/15, 23; 355/3 BE, 16; 198/806

[56] References Cited

U.S. PATENT DOCUMENTS

| | | | |
|---|---|---|---|
| 3,593,591 | 7/1971 | Chantland | 474/123 X |
| 3,942,696 | 3/1976 | Pira et al. | 226/21 |
| 3,986,650 | 10/1976 | Swanke et al. | 226/21 |
| 4,023,426 | 5/1977 | Duryea, Jr. | 474/123 |
| 4,174,171 | 11/1979 | Hamaker et al. | 355/3 BE |
| 4,243,167 | 1/1981 | Sander | 226/21 |

FOREIGN PATENT DOCUMENTS 547060 10/1957 Canada .................. 226/21
7514882 8/1976 Netherlands .................. 355/3 BE

OTHER PUBLICATIONS

"Automatic Belt Tensioning and Tracking Unit"—Xerox disc. #6 of vol. 1, Jun. 1976, by E. Vipond et al.
"Web Tracking Apparatus" by J. E. Morse et al. *Research Disclosure* No. 14510, pp. 29–31; May 9, 1976.

*Primary Examiner*—J. V. Truhe
*Assistant Examiner*—Richard M. Moose
*Attorney, Agent, or Firm*—H. Fleischer; H. M. Brownrout

[57] ABSTRACT

An apparatus which controls the lateral alignment of a belt arranged to move in a pre-determined path. A pivotably mounted belt support is frictionally driven to move in unison with the belt. Lateral movement of the belt applies a frictional force on the belt support. The frictional force tilts the belt support in a direction so as to restore the belt to the predetermined path of movement.

6 Claims, 3 Drawing Figures

BELT TRACKING SYSTEM

This invention relates generally to an electrophotographic printing machine, and more particularly concerns an improved apparatus for controlling the lateral movement of a moving belt.

In the process of electrophotographic printing, a photoconductive belt is charged to a substantially uniform potential so as to sensitize the surface thereof. The charged portion of the photoconductive belt is exposed to a light image of an original document being reproduced. Exposure of the charged photoconductive belt selectively discharges the charge thereon in the irradiated areas. This records an electrostatic latent image on the photoconductive belt corresponding to the informational areas contained within the original document. After the electrostatic latent image is recorded on the photoconductive belt, the latent image is developed by bringing a developer mixture into contact therewith. Generally, the developer mixture comprises toner particles adhering triboelectrically to the carrier granules. The toner particles are attracted from the carrier granules to the latent image forming a toner powder image on the photoconductive belt. The toner powder image is then transferred from the photoconductive belt to a copy sheet. Finally, the copy sheet is heated to permanently affix the toner particles thereto in image configuration. This general approach was originally disclosed by Carlson in U.S. Pat. No. 2,297,691 and has been further amplified and described by many related patents in the art.

Since the photoconductive belt passes through many processing stations during the printing operation, lateral alignment thereof is critical and must be controlled within prescribed tolerances. As the belt passes through each of these processing stations, the location of the latent image must be precisely defined in order to optimize the operations relative to one another. If the position of the latent image deviates from processing station to processing station, copy quality may be significantly degraded. Hence, lateral movement of the photoconductive belt must be minimized so that the belt moves in a pre-determined path.

Similarly, document handling systems frequently employ belts to transport original documents to and from the exposure station. The lateral movement of belts used in document handling systems must also be controlled in order to insure the correct positioning of the original documents relative to the optical system of the exposure station.

Ideally, if the belt were perfectly constructed and entrained about perfectly cylindrical rollers secured in an exactly parallel relationship with one another, the velocity vector of the belt would be substantially normal to the longitudinal axis of the roller and there would be no lateral translation of the belt. However, in actual practice, this is not feasible. Frequently, the velocity vector of the belt approaches the longitudinal axis of rotation of the roller at an angle. This produces lateral movement of the belt relative to the roller. Thus, the belt must be tracked or controlled to regulate its lateral position. Hereinbefore, lateral movement of a belt has been controlled by crowned rollers, flanged rollers or servo systems. Rollers of this type frequently produce high local stresses resulting in damage to the edges of the belt. Servo systems using steering rollers to maintain lateral control of the belt generally apply less stress to the sides thereof. However, servo systems are frequently rather complex and costly.

Various attempts have been made to develop simple and less costly steering systems. The following art appears to disclose relevant devices which control the lateral alignment of a moving belt:

U.S. Pat. No. 3,435,693
Patentee: Wright et al.
Issued: Apr. 1, 1969

U.S. Pat. No. 3,500,694
Patentee: Jones et al.
Issued: Mar. 17, 1970

U.S. Pat. No. 3,540,571
Patentee: Morse
Issued: Nov. 17, 1970

U.S. Pat. No. 3,698,540
Patentee: Jorden
Issued: Oct. 17, 1972

U.S. Pat. No. 3,702,131
Patentee: Stokes et al.
Issued: Nov. 7, 1972

U.S. Pat. No. 3,818,391
Patentee: Jorden et al.
Issued: June 18, 1974

Research Disclosure, May 9, 1976
Author: Morse et al.
No. 14510, page 29

The pertinent portions of the foregoing art may be briefly summarized as follows:

Wright et al. discloses a belt entrained about a plurality of spaced rollers. One end of the rollers are journaled in a pivotable frame. A sensing member is forced to the right by the lateral movement of the belt. The sensing member is connected by a linkage to the frame. If the belt is forced against the sensing member, the linkage rotates the frame to a position where the belt will track away from the sensing member until equilibrium is reached.

Jones et al. describes a belt tracking system in which a sensing finger detects lateral movement of the belt and actuates a control motor. The control motor rotates a cam shaft which rotates a camming mechanism to pivot a steering roller so as to return the belt to the desired path of travel.

Morse discloses a belt tracking system having a washer journaled loosely on a steering roller shaft. A pressure roller contacts the washer. The pressure roller is mounted on a pivotable rod and connected pivotably to a servo arm. The servo arm is connected pivotably to the frame. Horizontal motion of the belt causes the pressure roller to move horizontally. This moves the servo arm vertically pivoting the steering roller to restore the belt to the desired path.

Jorden, Stokes et al., and Jorden et al., all describe a belt steering apparatus employing a disc mounted loosely on one end of a belt support roller. The disc is connected to a linkage which pivots one of the other support rollers. Lateral movement of the belt causes the discs to translate pivoting the linkage. The linkage pivots the other support roller returning the belt to the pre-determined path of movement.

Morse et al. discloses a passive web tracking system. The web is supported in a closed loop path by a plurality of supports. The supports include a first roller. The first roller is pivotably mounted to align its axis of rotation of the normal direction of travel of the web. Fixed flanges engage the side edges of the web preventing lateral movement thereof. A second roller, spaced from the first roller, is supported at its mid-point by a self-aligning radial ball bearing. A yoke supports the second roller pivotably. Movement of the roller is limited to rotation about a castering axis and a gimble axis by a flexure arm. This permits the web to change direction providing uniform tension in the web span.

In accordance with the features of the present invention, there is provided an apparatus for controlling the lateral alignment of a belt arranged to move in a pre-determined path. The apparatus includes means for supporting the belt. The supporting means is frictionally driven by the belt to move in unison therewith. Means are provided for pivotably holding the supporting means. Lateral movement of the belt applies a frictional force on the supporting means. This frictional force pivots the supporting means in a direction such that the belt returns to the pre-determined path of movement.

Other aspects of the invention will become apparent as the following description proceeds and upon reference to the drawings, in which.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
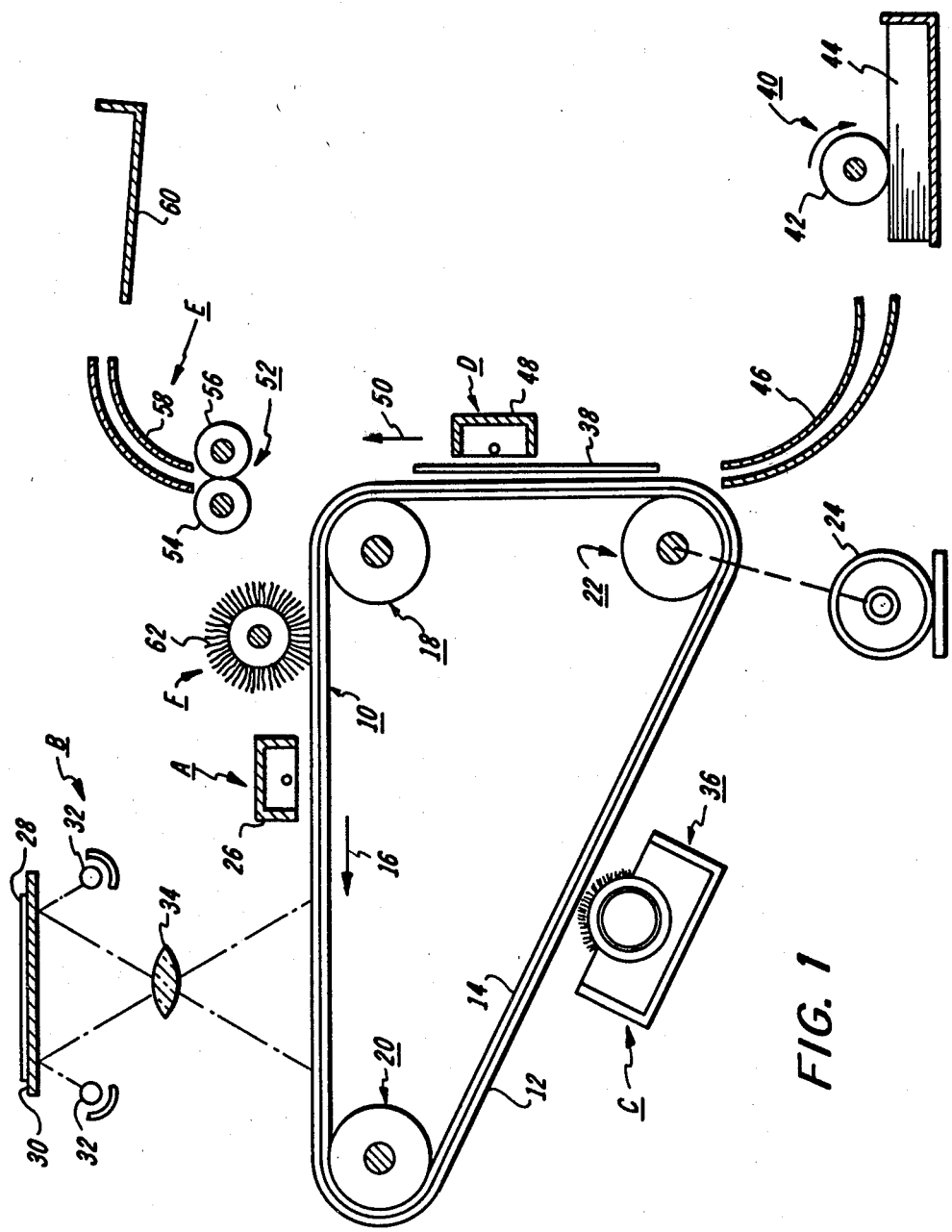
FIG. 1 is a schematic elevational view depicting an electrophotographic printing machine incorporating the features of the present invention therein.

For a general understanding of the features of the present invention, reference is made to the drawings. In the drawings, like reference numerals have been used throughout to indicate identical elements. FIG. 1 schematically depicts the various components of an illustrative electrophotographic printing machine incorporating the belt support and steering mechanism of the present invention therein. Although the belt support and steering mechanism is particularly well adapted for use in an electrophotographic printing machine, it will become evident from the following discussion that it is equally well suited for use in a wide variety of devices and is not necessarily limited in its application to the particular embodiment shown herein.

Inasmuch as the art of electrophotographic printing is well known, the various processing stations employed in the FIG. 1 printing machine will be shown hereinafter schematically and their operation described briefly with reference thereto.

As shown in FIG. 1, the electrophotographic printing machine employs a belt 10 having a photoconductive surface 12 deposited on a conductive substrate 14. Preferably, photoconductive surface 12 is made from a selenium alloy with conductive substrate 14 being made from an aluminum alloy. Belt 10 moves in the direction of arrow 16 to advance successive portions of photoconductive surface 12 sequentially through the various processing stations disposed about the path of movement thereof. Belt 10 is entrained about stripping roller 18, steering roller 20, and drive roller 22. Stripping roller 18 is mounted rotatably so as to rotate with the movement of belt 10. Steering roller 20 is resiliently urged into engagement with belt 10. This maintains belt 10 under the desired tension. In addition, roller 20 pivots in response to lateral movement of belt 10 to restore belt 10 to the desired path of travel. Roller 20 is in frictional engagement with belt 10 and rotates therewith as belt 10 advances in the direction of arrow 16. The detailed structure of steering roller 20 is shown hereinafter with reference to FIGS. 2 and 3. Drive roller 22 is rotated by motor 24 coupled thereto by suitable means, such as a drive belt. As roller 22 rotates, it advances belt 10 in the direction of arrow 16.

With continued reference to FIG. 1, initially a portion of belt 10 advances through charging station A. At charging station A, a corona generating device, indicated generally by the reference numeral 26, charges photoconductive surface 12 to a relatively high, substantially uniform potential.

Thereafter, the charged portion of photoconductive surface 12 passes through exposure station B. At exposure station B, an original document 28 is positioned face-down on a transparent platen 30. Lamps 32 flash light rays onto the original document. The light rays reflected from the original document are transmitted through lens 34 forming a light image thereof. Lens 34 focuses the light image onto the charged portion of photoconductive surface 12. The charged photoconductive surface is discharged by the light image of the original document to record an electrostatic latent image on photoconductive surface 12. The latent image recorded on photoconductive surface 12 corresponds to the informational areas contained with original document 28.

Next, drum 10 advances the electrostatic latent image recorded on photoconductive surface 12 to development station C. At development station C, a magnetic brush development system, indicated generally by the reference numeral 36, transports a developer mixture into contact with the electrostatic latent image recorded on photoconductive surface 12 of belt 10. Preferably, the developer mixture comprises carrier granules having toner particles adhering triboelectrically thereto. The development system forms a brush having a chain-like array of developer mixture extending outwardly therefrom. This mixture contacts the electrostatic latent image recorded on photoconductive surface 12 of drum 10. The latent image attracts the toner particles from the carrier granules forming a toner powder image on photoconductive surface 12.

The toner powder image developed on photoconductive surface 12 of belt 10 is then advanced to transfer station D. At transfer station D, a sheet of support material 38 is positioned in contact with the toner powder image deposited on photoconductive surface 12. The sheet of support material is forwarded to transfer station D by a sheet feeding apparatus, indicated generally by the reference numeral 40. Preferably, sheet feeding apparatus 40 includes a feed roll 42 contacting the uppermost sheet of the stack 44 of sheets of support material. Feed roll 42 rotates so as to advance the uppermost sheet from stack 44. The sheet moves from stack 44 into chute 46. Chute 46 directs the sheet of support material into contact with photoconductive surface 12 of belt 10 in a timed sequence so that the powder image developed thereon contacts the advancing sheet of support material at transfer station D. Transfer station D includes a corona generating device 48 which applies a spray of ions to the backside of sheet 38. This attracts the toner powder image from photoconductive surface 12 to sheet 38. After transfer, the sheet continues to move in the direction of arrow 50. A detack corona generating device (not shown) neutralizes the charge causing sheet 38 to adhere to belt 10. A conveyor system (not shown) advances sheet 38 from belt 10 to fusing station E.

Fusing station E includes a fuser assembly, indicated generally by reference numeral 52, which permanently affixes the transferred toner powder image to sheet 38. Preferably, fuser assembly 52 includes a heated fuser roller 54 and a back-up roller 56. Sheet 38 passes between fuser roller 54 and back-up roller 56 with the toner powder image contacting fuser roller 54. In this manner, the toner powder image is permanently affixed to sheet 38. After fusing, chute 58 guides the advancing sheet 38 to catch tray 60 for subsequent removal from the printing machine by the machine operator.

Invariably, after the sheet of support material is separated from the conductive surface 12, some residual toner particles remain adhering thereto. These residual toner particles are cleaned from photoconductive surface 12 at cleaning station F. Preferably, cleaning station F includes a rotatably mounted fiberous brush 62 in contact with photoconductive surface 12 of belt 10. The particles are cleaned from photoconductive surface 12 by the rotation of brush 62 in contact therewith. Subsequent to cleaning, a discharge lamp (not shown) floods photoconductive surface 12 with light to dissipate any residual electrostatic charge remaining thereon prior to the charging thereof for the next successive imaging cycle.

It is believed that the foregoing description is sufficient for purposes of the present invention to illustrate the general operation of an electrophotographic printing machine incorporating the features of the present invention therein.

Figure 2:
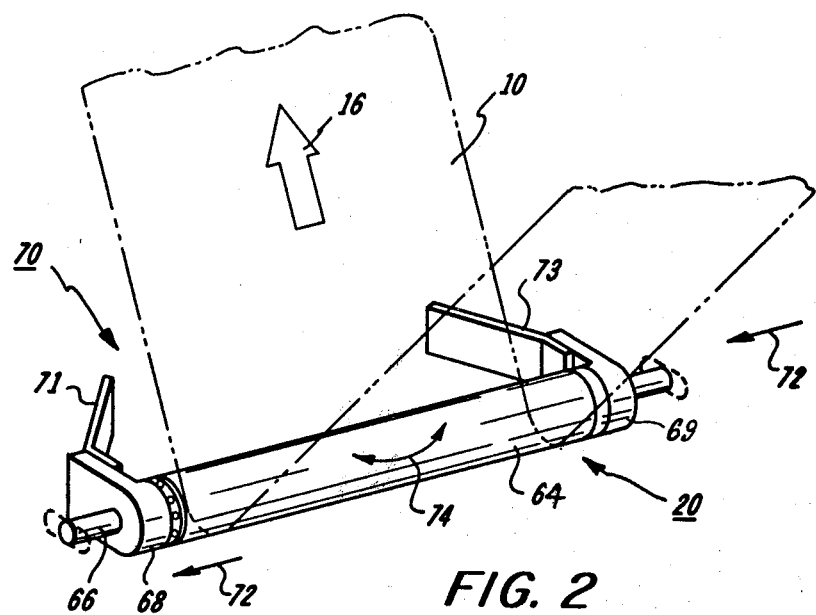
FIG. 2 is a perspective view of the steering roller used in the FIG. 1 printing machine.

Turning now to the specific subject matter of the present invention, FIG. 2 depicts a perspective view of steering roller 20. As shown thereat, steering roller 20 includes a tubular member 64 mounted rotatably on shaft 66. Shaft 66 is supported in end brackets 68 and 69. Brackets 68 are mounted on a furcated mounting indicated generally by the reference numeral 70. Furcated mounting 70 includes a pair of leaf springs 71 and 73 having one end thereof secured to brackets 68 and 69, respectively. Preferably the exterior circumferential surface of tube 64 is roughened so as to insure that belt 10 is in frictional engagement therewith. As belt 10 moves in the direction of arrow 16, it causes tubular member 64 to rotate about shaft 66. Tubular member 64 is mounted rotatably on a pair of opposed roller bearings. By way of example, tubular member 64 is preferably made from stainless steel having the exterior circumferential surface thereof roughened to a suitable surface finish which insures frictional contact between belt 10 the surface thereof. In this way, tubular member 64 moves in unison with belt 10. The extensions of leaf springs 71 and 73 intersect one another at a pivot point about which roller 20 tilts during lateral movement of belt 20.

In operation, lateral movement of belt 10, in the direction of arrow 72, applies a frictional force on tubular member 64. This frictional force is transmitted to leaf springs 71 and 73 which deflect in response thereto. Deflection of leaf springs 71 and 73 pivot tubular member 64 about an axis substantially normal to the longitudinal axis of shaft 66, as indicated by arrow 74. This pivoting or tilting of tubular member member 64 causes belt 10 to return to the predetermined path of travel. Preferably, leaf springs 71 and 73 are made from stainless steel.

Figure 3:
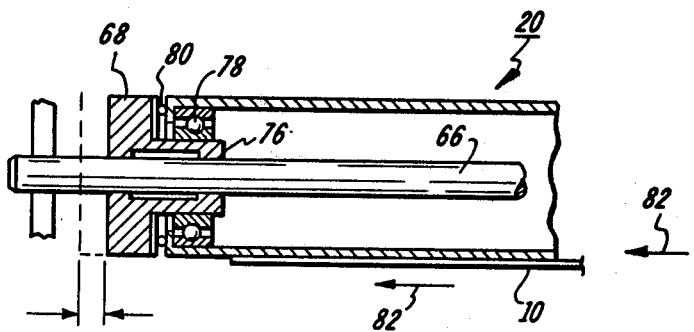
FIG. 3 is a fragmentary, sectional elevational view illustrating the details of the FIG. 2 steering roller.

Referring now to FIG. 3, there is shown a fragmentary, sectional elevational view of steering roller 20. Inasmuch as roller 20 is symmetrical, only one-half thereof is shown, the other half being identical thereto. As depicted thereat, end bracket 68 includes an interior hub 76 mounted on shaft 66. The interior race of bearing 78 is mounted on hub 76. The exterior race of bearing 78 is secured to tubular member 64. Bearings 80 are axially interposed between the end of tubular member 64 and end bracket 68 so as to insure that bracket 68 does not interfere with the rotation of tubular member 64. In operation, lateral movement of belt 10 applies a frictional force on tubular member 64. The frictional force deflects leaf springs 71 and 73 which tilt tubular member 64 in the direction of arrow 74 so as to restore belt 10 to the desired path of travel.

While the present invention has been described as controlling the lateral movement of a photoconductive belt, one skilled in the art will appreciate that the belt support and steering may equally well be employed in a document handling system.

In recapitulation, it is evident that the apparatus of the present invention controls the lateral movement of the belt and provides a support therefor. The belt is frictionally coupled to a drive roll so as to move in unison therewith. Any lateral movement of the belt tilts the roller causing the belt to return to the desired path of travel.

It is, therefore, evident that there has been provided in accordance with the present invention, an apparatus for supporting and controlling the lateral movement of a photoconductive belt so that the belt moves in a pre-determined path. This apparatus fully satisfies the aims and advantages hereinbefore set forth. While this invention has been described in conjunction with a specific embodiment thereof, it will be evident that many alternatives, modifications, and variations will be apparent to those skilled in the art. Accordingly, it is intended to embrace all such alternatives, modifications, and variations as fall within the spirit and broad scope of the appended claims.

What is claimed is:

1. An electrophotographic printing machine of the type having a photoconductive belt arranged to move in a pre-determined path through a plurality of processing stations disposed therealong, wherein the improvement includes:

means for supporting the photoconductive belt, said supporting means being frictionally driven by the photoconductive belt to move in unison therewith in at least a direction substantially normal to the direction of movement along the pre-determined path; and means for pivotably holding said supporting means so that movement of the photoconductive belt in the direction substantially normal to the direction of movement along the pre-determined path applies a frictional force on said supporting means to pivot said supporting means in a direction such that the photoconductive belt returns to the pre-determined path of movement.

2. A printing machine according to claim 1, wherein said holding means resiliently urges said supporting means into engagement with the photoconductive belt to maintain the photoconductive belt at a pre-selected tension.

3. A printing machine according to claim 2, wherein said supporting means includes an elongated roller mounted rotatably in said holding means so that the frictional force between said roller and the photoconductive belt rotates said roller about the longitudinal axis thereof.

4. A printing machine according to claim 3, wherein said holding means includes a furcated member which pivots said roller about an axis substantially normal to the longitudinal axis thereof in response to a frictional force applied on said roller by the belt in a direction substantially parallel to the longitudinal axis thereof.

5. A printing machine according to claim 4, wherein said furcated member includes a pair of leaf springs with one of said pair of leaf springs supporting one end of said roller and the other of said pair of leaf springs supporting the other end of said roller, said pair of leaf springs resiliently urging said roller into engagement with the photoconductive belt.

6. A printing machine according to claim 5, wherein said roller includes:
- a tubular member having a roughened circumferential surface engaging the portion of the photoconductive belt passing thereover;
- a substantially stationarily mounted shaft member disposed interiorly of and spaced from said tubular member, said shaft member having one end thereof supported by one of said leaf springs with the other end thereof being supported by the other of said pair of leaf springs; and
- means for rotatably mounting said tubular member on said shaft member.

* * * * *